United States Patent [19]

Jabarin

[11] Patent Number: 4,605,576
[45] Date of Patent: Aug. 12, 1986

[54] MULTILAYER PLASTIC ARTICLES

[75] Inventor: Saleh A. Jabarin, Holland, Ohio

[73] Assignee: Owens-Illinois, Inc., Toledo, Ohio

[21] Appl. No.: 663,636

[22] Filed: Oct. 22, 1984

[51] Int. Cl.$^4$ .............................................. B27N 5/02
[52] U.S. Cl. ...................................... 428/35; 428/349; 428/516; 428/218
[58] Field of Search ................. 428/35, 349, 516, 218

[56] References Cited

U.S. PATENT DOCUMENTS

| | | | |
|---|---|---|---|
| 3,595,735 | 7/1971 | Tyrrell | 428/516 |
| 3,955,697 | 5/1976 | Valdyi | 215/1 C |
| 4,123,576 | 10/1978 | Kobayashi et al. | 428/35 |
| 4,182,457 | 1/1980 | Yamada et al. | 215/1 C |
| 4,254,169 | 3/1981 | Schroeder | 428/35 |
| 4,261,482 | 4/1981 | Yamada et al. | 428/35 |
| 4,370,368 | 1/1983 | Hirata et al. | 428/35 |
| 4,393,106 | 7/1983 | Maruhashi et al. | 428/35 |
| 4,444,828 | 4/1984 | Anthony et al. | 428/218 |
| 4,451,512 | 5/1984 | Yazaki et al. | 428/36 |
| 4,456,660 | 6/1984 | Colombo | 428/516 |

FOREIGN PATENT DOCUMENTS 095299 5/1983 European Pat. Off.

*Primary Examiner*—Edith Buffalow
*Attorney, Agent, or Firm*—Philip M. Rice

[57] ABSTRACT

A multilayer high gas barrier plastic article wherein the article comprises a laminate including at least one layer of a high gas barrier polymer and at least one layer composed of an intimate blend of a propylene based polymer and an amount of linear low density polyethylene wherein said linear low density polyethylene is up to thirty weight percent or less of the blend. The multilayer high gas barrier article incorporating the intimate blend in conjunction with a high gas barrier polymer layer has good gas barrier characteristics, good mechanical properties and excellent low temperature drop impact characteristics, particularly when fabricated into free-standing bottles.

30 Claims, No Drawings

MULTILAYER PLASTIC ARTICLES

BACKGROUND OF THE INVENTION

Articles fabricated from high barrier multilayer plastic structures have recently gained wide acceptance in the market. Films of multilayer structure are well-suited for containing foods while rigid or semi-rigid containers fabricated by blow molding have recently gained wide public acceptance as containers for many types of food products. Particularly, multilayer plastic containers, like bottles, food trays and the like, are a laminate of many individual plastic layers, including as one layer of the structure a gas barrier polymer. Such trays, bottles and bags made from film have gained a significant acceptance in the market place for storing food products such as condiments, sauces, syrups and a wide variety of other food products which require refrigeration. The use of such laminated multilayer barrier packages to package cold use food items has been somewhat restricted, however, particularly in the area of rigid and semi-rigid bottles by reason of the fact that many multilayer plastic containers including a barrier layer show significant numbers of failures upon accidental impact with a surface such as by dropping the container inadvertently onto the floor when the container is cold. This results in an unacceptable level of breakage upon use or shipment and has significantly restricted the utility of multilayer barrier packages for certain end uses.

For the above reason, there is a need in the art for an improved laminated multilayer high barrier plastic package structure, particularly a freestanding bottle, having an improved low temperature drop impact strength when used with food items which require refrigeration.

SUMMARY OF THE INVENTION

The present structure, typically a bottle, provides a multilayer high barrier plastic container suitable for packaging cold use food items, which container shows significantly higher low temperature drop impact strengths than heretofore been available in the art without an undue sacrifice in gas barrier performance or advantageous mechanical properties. The containers are an intimate laminate of a plurality of layers of individual plastic layers and are easily formed by extrusion blow molding using conventional equipment.

The multilayer high barrier plastic laminated containers according to the present invention is a multilayer high barrier plastic laminated container wherein the container comprises a laminate including at least one layer of a high barrier gas polymer laminated to at least one layer composed of an intimate blend of a propylene based polymer and an amount of linear low density polyethylene wherein said low density polyethylene is up to 30 weight percent of the blend, and has a density of less than about 0.93 grams per cubic centimeter and a melt index of less than about 10 grams/10 minutes. The multilayer laminated barrier containers incorporating the polyolefin based, linear low density polyethylene fusion blended material of the present invention in conjunction with a barrier polymer layer show significantly improved low temperature drop impact characteristics, while maintaining high gas barriers and excellent mechanical properties. This makes such containers well-suited for use with cold usage foods such as mustard, catsup, mayonnaise, syrups, sauces, as well as a wide variety of other cold usage foodstuffs.

The layer composed of the intimate fusion blend of the propylene based polymer typically includes polypropylene homopolymer or propylene-ethylene copolymer and the linear low density polyethylene component, which blended material preferably includes 30 percent or less by weight of the linear low density polyethylene in the total blend wherein the linear low density polyethylene preferably has a density of less than about 0.93 grams per cubic centimeter and a melt index of less than 10 grams/10 minutes. Preferably the barrier polymer layer is mainly composed of an ethylene-vinyl alcohol copolymer.

DETAILED DESCRIPTION OF THE INVENTION

The multilayer high barrier laminated plastic articles according to the present invention will contain at least two layers and preferably five or six layers wherein at least one layer of the laminate comprises a high gas barrier polymer and at least one layer of the laminate comprises an intimate fusion blend of a propylene based polymer and a linear low density polyethylene, or blend of multiple linear low density polymers, wherein the linear low density polyethylene component is 30 weight percent of the blend or less and preferably has a density in the range of 0.91 to 0.93 grams per cubic centimeter and a melt index of less than 10 grams/10 minutes. Most preferred is a linear low density polyethylene having a melt index of between about 1 and 2 and a density of about 0.92 grams per cubic centimeter. As defined in the specification, unless otherwise specified, melt index is measured by ASTM standard D-1238 and density is measured by ASTM standard D-792.

The linear low density polyethylene polymer(s) included in the blends according to the present invention are defined as linear low density polyethylene polymers, have a density in the range of about 0.91 to about 0.93 grams per cubic centimeter and a melt index of less than 10 gram/10 minutes.

The linear low density polyethylene(s) according to the present invention are ethylene polymers, or blends of multiple such polymers, having polymerized therein about 2–6 and preferably about 4–6 mole percent of an alpha-monoolefin content containing about 3–12 carbon atoms with the balance of the monomer polymerized therein being ethylene. The linear low density ethylene polymer(s) according to the present invention have long linear chains with controlled numbers of relatively short chain branches attached to the linear chain backboned along its entire length. These side chains, or "branches", are short and will contain from about 1–10 carbon atoms depending upon the particular alpha-monoolefin employed in the preparation of the polymer. The linear low density ethylene polymer(s) differ structurally from low density ethylene polymers made by high pressure, free radical initiated polymerizations in having few, if any, long chain branches.

The linear low density polyethylene polymers according to the present invention are commercially available from a variety of sources. A preferred material for the linear low density polyethylene according to the present invention are available from the Dow Chemical Company and are identified as Dowlex 2645, which has the preferred density of 0.92 grams per cubic centimeter and a melt index of 1 gram/10 minutes.

As defined herein, the phrase "propylene based polymer" includes polypropylene homopolymer having a density of 0.89 to 0.91 grams per cubic centimeter and a melt index of less than 30 grams/ten minutes copolymers including 2–5 mole percent ethylene copolymerized with the propylene, such copolymers having a density of about 0.89 to about 0.91 grams per cubic centimeter and a melt index of less than 30 grams/10 minutes and also includes blends of such individual polymers.

As defined herein, the phrase "high gas barrier polymer" means a polymer having a permeability to oxygen of 3 cc-mil/100 sq. in. day atm. or less. The phrase "high gas barrier polymer" specifically includes single polymer homogeneous and multiple polymer blended composition of more than one suitable polymer.

Oxygen barrier properties of films of the high gas barrier polymers as defined above are determined with a MoCon Oxtran 1050 oxygen permeation analyzer which is commercially available. It uses ten sample cells and one coulometric detector that is switched among the cells by a solenoid valve. When mounted in a cell, one side of a sample (upstream) can be exposed to nitrogen or oxygen. On the downstream side, a nitrogen carrier gas that has only very small amounts of residual oxygen flows through the cell, picks up any permeated oxygen and carries it to the coulometric detector. In the detector, the oxygen reacts electrochemically and produces an electrical current that is measured by a conventional chart recorder. The humidities of the gases are controlled by bubblers in the gas lines before entering the sample cells. The temperatures of the tests are controlled by placing the apparatus in a temperature controlled room.

The procedure used for oxygen barrier tests includes a nitrogen purge after mounting the samples in the apparatus. The purge not only removes oxygen from the sample that was previously adsorbed from the atmosphere but also establishes a baseline reference signal for the apparatus. After the purge is completed, oxygen is switched to the upstream side of the sample. The rate of oxygen permeating through the sample is monitored and the test continues until it has reached a steady-state. The signals at steady-state conditions are used to calculate the gas transmission rates according to the procedures described in the manual of the MoCon apparatus, which is incorporated herein by reference.

A preferred multilayer high barrier plastic laminate structure according to the present invention is a five layer structure having a pair of outer layers, a pair of intermediate adhesive tie layers and a central core layer. The outer layers are composed of the blend of a propylene based polymer and an amount of linear low density polyethylene wherein the linear low density polyethylene is 30 weight percent or less of the total weight of the blend. Preferably, the linear low density polyethylene will have a density of about 0.92 grams per cubic centimeter and a melt index of less than ten grams per ten minutes. The polypropylene based polymer is most preferably a propylene-ethylene copolymer having between 2 and 4 mole percent of ethylene copolymerized with the main fraction of propylene. Also, preferably, the amount of linear low density polyethylene in the blended layer is about 20 weight percent when used with the preferred propylene-ethylene copolymer set forth above.

The intermediate layer or so-called adhesive tie layer which firmly bonds the outer layers to the inner core layer is preferably an olefinic hydrocarbon polymer adhesives. As defined herein, the phrase "olefinic hydrocarbon polymer" means a polyethylene, polypropylene or copolymer of ethylene and/or propylene and other unsaturated olefins of 4 carbons or less and includes modified polyolefins containing modifiers such as acids, acid anhydrides and acetates and specifically includes single adhesive homogeneous material and multiple adhesive blended compositions. A preferred material is a maleic acid anhydride modified polyethylene-polypropylene blend manufactured by Mitsui Toatsu Company and marketed under the tradename LONPLY T-3 adhesive. Another preferred adhesive material is a maleic anhydride modified polyolefin manufactured by Mitsubishi Petrochemical Corporation and marketed under the tradename MODIC. Alternative but less preferred materials for use in the intermediate adhesive tie layers are a modified polyethylene produced by Mitsubishi Chemical and marketed under the tradename NOVOTEC AP-220L; a modified polyolefin containing vinyl acetate functional groups marketed by DuPont under the tradename CXA (E-136); a modified polyolefin composition marketed by Chemplex Corporation under the tradename PLEXAR and a modified polyolefin marketed by Mitsui Petrochemical Company under the tradename of ADMER. As set forth above, the MODIC and LONPLY T-3 adhesive tie layer materials are most preferred when using a propylene-ethylene copolymer in the outer layers.

The central core layer of high gas barrier polymer is preferably ethylene-vinyl alcohol copolymer which is commercially available under a variety of tradenames. For example, the material marked by Kuraray Company as EVAL-Type F having the following characteristics is particularly preferred due to its excellent barrier characteristics: melt index 1.5 grams/10 minutes; density of 1.19 grams per cubic centimeter; ethylene content of 32 mole percent; crystallization temperature of 161° C.; melt temperature of 180° C. and a glass transition temperature of 69° C.

Another acceptable EVAL material is available under the tradename EVAL-Type E manufactured by KURARAY and having the following physical characteristics: melt index 5.8 grams/10 minutes at 190° C. and 2160 grams; density of 1.14 grams per cubic centimeter; ethylene content of 44 mole percent; crystallization temperature of 142° C.; melt temperature of 162° C. and a glass transition temperature of 61° C. The EVAL-Type E shows good flexibility when incorporated into multilayer structures and is thus acceptable but less preferred from a barrier performance standard than EVAL-Type F.

Alternative and acceptable high gas barrier polymers include polyamides like nylon, particularly the nylons manufactured by Mitsubishi Gas Co. and sold under the tradename MXD-6 and having the following physical characteristics: density of 1.21 grams per cubic centimeter (ASTM D-792), melting point of 243° C. (ASTM D-117) and glass transition temperature 102° C. Another suitable material for the core high gas barrier polymer layer are extrudable polyvinylidene chloride materials like extrudable Saran available under the tradename XO-5253-16 from Dow Chemical Co. as the supplier and having the physical characteristics as follows: density 1.74 grams per cubic centimeter; melting point 160° C. and glass transition temperature of −1° C.

Another preferred composition of the multilayer high barrier plastic structure according to the present invention is identical to the five layer structure set forth above but includes a scrap layer which is container scrap material reground into a fine particulate and remelted for inclusion into the extruded parison from which laminated structures are made. Such regrind layer is most preferably placed at a position between one of the outer blend layers and its adjacent intermediate adhesive tie layer and most preferably includes the proportions of 50 weight percent regrind and 50 weight percent virgin propylene based polymer.

An alternative embodiment of the multilayer high barrier plastic structures according to the present invention comprises a pair of outer layers of the propylene based polymer admixed with the linear low density polymer(s) surrounding a central core layer of the high gas barrier polymer. This embodiment of the invention excludes the regrind or scrap layer as well as the intermediate adhesive tie layers. Obviously, most preferred is the embodiment of the invention including the adhesive tie layers so that the multilayer high barrier plastic structure produced according to the present invention not only has excellent gas barrier characteristics but also exhibits good resistance to delamination due to the adhesive tie layers as well as good top load strength and the significantly improved low temperature drop impact strength according to the present invention while minimizing the waste of scrap material by recycling it into the structure.

In the preparation of the materials for use in the present invention, the high gas barrier polymer materials are typically used in virgin form from the supplier without any modification.

The blended layer comprising a propylene based polymer admixed with the linear low density polyethylene is typically a physical admixture of the propylene based polymer granules, pellets or flake and the linear low density polyethylene granules, pellets or flake which are roughly admixed prior to introduction to a conventional twin screw extruder wherein thorough melt phase mixing occurs prior to parison extrusion. Such mixing extruders are well known in the art and available from multiple commercial sources.

Similarly, the thoroughly admixed material from the extruder may be introduced directly into a extrusion head wherein it is hot melt extruded and thereby intimately laminated with at least one layer of the high gas barrier polymer to form the most rudimentary embodiment of the present invention, namely a blended layer of the propylene based polymer and the linear low density polyethylene in intimate contact to form a laminate structure with the high gas barrier polymer layer. As set forth above in a preferred embodiment, the structure according to the present invention is a five or six layer structure as set forth above which may be formed by coextrusion processes and equipment which are well-known and commercially available in the art.

The following example is set forth to illustrate more clearly the principal and practice of the present invention to those skilled in the art and specifically illustrating the significantly improved low temperature drop impact strength of multilayer high barrier plastic laminate prepared according to the present invention and particularly the superior performance of the laminate when formed into the preferred article according to the invention, namely, a free-standing narrow neck bottle for food like catsup, barbecue sauce and the like.

Five hundred pounds of a blended material comprising 80 percent by weight of propylene-ethylene copolymer, 20 percent by weight of linear low density polyethylene was made. The propylene-ethylene copolymer was Rexene 23B-2 brand copolymer purchased from Rexene Company of Paramus, N.J., the propylene-ethylene copolymer containing 2 percent ethylene content. The linear low density polyethylene was a single polymer material, namely, Dowlex 2645 of 0.92 g/cc density and melt index of 1 gram/10 minutes purchased from Dow Chemical Company.

The pellet form feedstock was thoroughly admixed mechanically and introduced into a twin screw mixing extruder. The extruder used was a Werner and Pfleiderer twin-screw extruder, Model ZSK-30 which is commercially available.

The processing parameters for the screw blending were as follows:

| | Processing Parameters | |
|---|---|---|
| Temperature, °C. | Set | Actual (range) (°C.) |
| Zone 1 input | 165 | 165–166 |
| 2 intermediate | 205 | 205–206 |
| 3 intermediate | 205 | 204–205 |
| 4 intermediate | 205 | 203–205 |
| 5 outlet | 205 | 205–208 |
| Melt Temp. at outlet | | 212–214 |
| RPM - Both screws | | 300 |
| Feed rate setting | | 6 |
| Pressure, psi | | 150–220 |
| Torque, % | | 50–60 |
| Vacuum, in Hg | | 27 |

The extruded material, which is then an intimate fusion blend of the two materials, is pelletized by conventional means as it exits the extruder.

To prepare six layer, regrind containing containers as described above, which are the most economical containers to manufacture, five layer containers were fabricated and ground into scrap to be used as the feedstock for the regrind or scrap layer necessary to generate the six layer scrap-containing containers.

The five layer containers were molded having a layer structure as follows: Virgin Rexene 23B-2 propylene-ethylene copolymer outer layer; Toyo Seikan Lonply T-3 adhesive layer; virgin EVAL-F ethylene-vinyl alcohol, copolymer barrier layer from Kuraray Chemical Co.; high gas barrier layer; Toyo Seikan Lonply T-3 adhesive layer; virgin Rexene 23B-2 propylene-ethylene copolymer inner layer.

The five layer containers were blow molded on a Bekum type multilayer extrusion blow molding machine using three zone type extruders into a single container mold of 46 ounce size weighing about 72 grams. The machine is available from Bekum Maschinenfabriken GmbH, Berlin, West Germany.

The containers so molded were collected and ground into a scrap to be recycled into six layer, regrind inclusive containers.

Then, using the scrap generated from the five layer containers described above, six layer containers including a recycled scrap layer were blow molded on the same machine, same size, same weight, same shape but having a larger structure as follows: Virgin Rexene 23B-2 propylene copolymer outer layer (4.5 mils); reground five layer container scrap plus virgin Rexene 23B-2 propylene-ethylene layer, wherein the regrind and virgin copolymer are present at a weight: weight ratio of 1:1 (24.5 mils); Toyo Seikan Lonply T-3 adhesive layer (0.7 mils); virgin EVAL-F ethylene-vinyl alcohol copolymer barrier layer from Kuraray Chemical Co. high gas barrier layer (3.0 mils); Toyo Seikan Lonply T-3 adhesive layer (2.0 mils); virgin Rexene 23B-2 propylene-ethylene copolymer inner layer (5.5 mils).

After extrusion molding, the newly formed containers were allowed to stand at room temperature for 24 hours then hot filled with 195°±5° F. water leaving only about one-half inch of head space. Then conventional heat sealed foil closures, with a rigid cap over closure, were applied. The sealed hot containers were cooled for 15 minutes to stimulate a pack-out temperature of about 120° F. and then moved to a cold storage room which is at 40° F., where the filled sealed containers remained for 24 hours.

A commonly accepted test for measuring low temperature drop impact strength is the so-called Estimated Mean Failure Height (EMFH) Test.

In this test, which is defined according to ASTM D 2463-74, a group of test containers are dropped from various heights, the drop height being elevated or lowered depending on the result from the most previous test result. So, if the previous containers failed (i.e. ruptured on impact), the drop height is lowered, conversely if the container did not rupture on impact, the drop height is raised.

For comparative purposes, six layer conventional containers, including a regrind layer, were prepared as set forth above with the sole exception that the intimate fusion blended material of the propylene-ethylene copolymer blended with linear low density polyethylene was replaced by an identical thickness of propylene-ethylene copolymer which did not include 20 by weight linear low density polyethylene. These containers were the control containers against which the containers were compared. The test ASTM D 2463-74 is typically employed with the containers being dropped from a predetermined height onto a flat surface or onto a surface which is elevated at 30° of angle above the normal flat surface test. The 30° test is a significantly more severe test and has been used herein in addition to the flat surface type test to demonstrate the over-all superior results of the present containers.

The test data generated is set forth below using 21 containers:

TABLE 1

| CONTROL CONTAINERS | |
|---|---|
| Drop Height (inch) | % Cumulative Failure |
| A. FLAT BOTTOM DROP DATA | |
| 30 | 12.5 |
| 42 | 25.0 |
| 48 | 37.5 |
| 54 | 50.0 |
| 60 | 75.0 |
| 66 | 100.0 |
| B. 30° ANGLE DROP DATA | |
| 26 | 28.6 |
| 28 | 43.0 |
| 30 | 57.0 |
| 32 | 71.4 |
| 36 | 100.0 |

TABLE 2

| CONTAINERS INCLUDING LINEAR LOW DENSITY POLYETHYLENE BLENDED WITH PROPYLENE-ETHYLENE COPOLYMER | |
|---|---|
| Drop Height (inch) | % Cumulative Failure |
| A. FLAT BOTTOM DROP DATA | |
| 96 | 20 |
| 102 | 40 |
| 108 | 60 |
| 114 | 80 |
| 120 | 100 |
| B. 30° ANGLE DROP DATA | |
| 30 | 20 |
| 42 | 40 |
| 44 | 60 |
| 46 | 100 |

Note that the low temperature drop impact test data clearly demonstrates the superiority of the containers fabricated using the novel propylene based polymer/linear low density polyethylene blended material as one of the layer components of the laminate structure when compared to multilayer containers using a propylene based polymer without the inclusion of the linear low density polyethylene material as one of the layer components.

Significantly, the flat bottom drop test clearly demonstrates that the new containers prepared according to the teaching of the present invention on average show about 100% improvement over the conventional control containers.

Also significant is the discovery that according to the present invention that even in the more severe 30° angle drop impact test containers according to the present invention show about a 30% improvement over the conventional control containers. Any patents and/or publications referred to herein are incorporated by reference.

I claim:

1. A multilayer plastic structure comprising a laminate of at least one layer of a high gas barrier polymer and at least one layer of an intimate blend of at least one propylene based polymer and at least one linear low density polyethylene wherein the total amount of the linear low density polyethylene is equal to or less than about 30 percent by weight of said blend, the structure having an outstanding balance of properties including gas barrier resistance including permeability to oxygen of not more than 3 cc-mil/100 sq. in. day, resistance to delamination, top load strength and low temperature drop impact resistance according to ASTM test 2463-74.

2. The invention defined in claim 1 wherein the propylene based polymer is polypropylene homopolymer.

3. The invention defined in claim 1 wherein the propylene based polymer is a propylene-ethylene copolymer including about 2–5 mole percent ethylene copolymerized with the propylene.

4. The invention defined in claim 1 wherein the linear low density polyethylene has a density of less than about 0.93 grams per cubic centimeter and a melt index of less than 10 grams per ten minutes.

5. The invention defined in claim 1 wherein said linear low density polyethylene has a density of about 0.92 grams per cubic centimeter and a melt index of less than about 2 grams/10 minutes.

6. The invention defined in claim 1 wherein said linear low density polyethylene is equal to about 20 percent by weight of the said blend.

7. A container formed from the structure of claim 1.

8. The invention defined in claim 1 wherein said high gas barrier polymer is an ethylene-vinyl alcohol copolymer.

9. A multilayer plastic structure comprising a laminate of a pair of outer layers and a centrally located core layer wherein said centrally located core layer includes at least one high gas barrier polymer and said outer layers are each an intimate blend of at least one propylene based polymer and at least one linear low density polyethylene with the total amount of the linear low density polyethylene being equal to or less than 30 percent by weight of said blend, the structure having an outstanding balance of properties including gas barrier resistance including permeability to oxygen of not more than 3 cc-mil/100 sq. in. day, resistance to delamination, top load strength and low temperature drop impact resistance according to ASTM test 2463-74.

10. The invention defined in claim 9 wherein the propylene based polymer is polypropylene homopolymer.

11. The invention defined in claim 9 wherein the propylene based polymer is a propylene-ethylene copolymer including about 2-5 mole percent ethylene copolymerized with the propylene.

12. The invention defined in claim 9 wherein the linear low density polyethylene has a density of less than about 0.93 grams per cubic centimeter and a melt index of less than about 10 grams per ten minutes.

13. The invention defined in claim 9 wherein said linear low density polyethylene has a density of about 0.92 grams per cubic centimeter and a melt index of less than about 2 grams per ten minutes.

14. The invention defined in claim 9 wherein said linear low density polyethylene is equal to about 20 percent by weight of the said blend.

15. A container formed from the structure of claim 9.

16. The invention defined in claim 9 wherein said high gas barrier polymer is an ethylene-vinyl-alcohol copolymer.

17. A multilayer plastic structure comprising a laminate of a pair of outer layers, a pair of intermediate adhesive layers and a centrally located core layer wherein:
said outer layers being formed from an intimate blend of at least one propylene based polymer and at least one linear low density polyethylene wherein the toal amount of the linear low density polyethylene is equal to or less than about 30 percent by weight of said blend;
said intermediate adhesive layers being formed from at least one olefinic hydrocarbon polymer; and
said centrally located core layer being formed from at least one high gas barrier polymer, the structure having an outstanding balance of properties including gas barrier resistance including permeability to oxygen of not more than 3 cc-mil/100 sq.in. day, resistance to delamination, top load strength and low temperature drop impact resistance according to ASTM test 2463-74.

18. The invention defined in claim 17 wherein the propylene based polymer is polypropylene homopolymer.

19. The invention defined in claim 17 wherein the propylene based polymer is a propylene-ethylene copolymer including about 2-5 mole percent ethylene copolymerized with the propylene.

20. The invention defined in claim 17 wherein the linear low density polyethylene has a density of less than about 0.93 grams per cubic centimeter and a melt index of less than about 10 grams per ten minutes.

21. The invention defined in claim 17 wherein the linear low density polyethylene has a density of about 0.92 grams per cubic centimeter and a melt index of less than about 2 grams per ten minutes.

22. The invention defined in claim 17 wherein said linear low density polyethylene is equal to about 20 percent by weight of the said blend.

23. A container formed from the structure of claim 17.

24. The invention defined in claim 15 wherein the high gas barrier polymer is an ethylene-vinyl alcohol copolymer.

25. A composition of matter comprising a blend of a propylene based polymer that is a copolymer of ethylene and propylene and a linear low density polyethylene wherein the total amount of the linear low density polyethylene is no more than about 20 percent by weight of said blend.

26. The invention defined in claim 25 wherein the copolymer is about 2 to 4 mole percent ethylene and 96 to 98 mole percent polypropylene.

27. The invention defined in claim 25 wherein the propylene based polymer is a propylene-ethylene copolymer including about 2-5 mole percent ethylene copolymerized with the propylene, the copolymer being about 20 weight percent of the blend.

28. The invention defined in claim 25 wherein the linear low density polyethylene has a density of less than about 0.93 grams per cubic centimeter and a melt index of less than 10 grams per ten minutes.

29. The invention defined in claim 25 wherein said linear low density polyethylene has a density of about 0.92 grams per cubic centimeter and a melt index of less than about 2 grams/10 minutes.

30. The invention defined in claim 25 wherein said linear low density polyethylene is equal to about 20 percent by weight of the said blend and the copolymer has a density of about 0.89 to 0.9/gms/cc and a melt index of less than about 30 grams/10 min.

* * * * *

US004605576B1

REEXAMINATION CERTIFICATE (3841st)

United States Patent [19]
Jabarin

[11] B1 4,605,576
[45] Certificate Issued Aug. 24, 1999

[54] MULTILAYER PLASTIC ARTICLES

[75] Inventor: Saleh A. Jabarin, Holland, Ohio

[73] Assignee: Owens-Brockway Plastic Products, Inc., Toledo, Ohio

Reexamination Requests:
No. 90/004,570, Mar. 3, 1997
No. 90/004,593, Apr. 7, 1997

Reexamination Certificate for:
Patent No.: 4,605,576
Issued: Aug. 12, 1986
Appl. No.: 06/663,636
Filed: Oct. 22, 1984

[51] Int. Cl.$^6$ ............................. B32B 27/32; B27N 5/02
[52] U.S. Cl. ........................ 428/35; 428/35.4; 428/36.7; 428/516; 428/518; 428/520; 428/218; 428/349; 525/240
[58] Field of Search ................................ 428/516, 35.4, 428/36.6, 36.7, 518, 520, 218, 349; 525/240

[56] References Cited

U.S. PATENT DOCUMENTS

| | | |
|---|---|---|
| 2,728,752 | 12/1955 | Brown . |
| 3,058,963 | 10/1962 | Vandenberg . |
| 3,560,325 | 2/1971 | Sogi et al. . |
| 3,789,085 | 1/1974 | Kishimoto et al. . |
| 3,847,728 | 11/1974 | Hirata et al. . |
| 3,857,754 | 12/1974 | Hirata et al. . |
| 3,882,259 | 5/1975 | Nohara et al. . |
| 3,931,449 | 1/1976 | Hirata et al. . |
| 3,932,692 | 1/1976 | Hirata et al. . |
| 3,975,463 | 8/1976 | Hirata et al. . |
| 4,079,850 | 3/1978 | Suzuki et al. . |
| 4,082,854 | 4/1978 | Yamada et al. . |
| 4,092,389 | 5/1978 | Sakurai . |
| 4,182,457 | 1/1980 | Yamada et al. . |
| 4,213,750 | 7/1980 | Kubota et al. . |
| 4,217,161 | 8/1980 | Yamada et al. . |
| 4,261,473 | 4/1981 | Yamada et al. . |
| 4,304,891 | 12/1981 | Sato et al. . |
| 4,434,264 | 2/1984 | Ficker . |
| 4,522,775 | 6/1985 | Briggs et al. . |
| 4,705,708 | 11/1987 | Briggs et al. . |
| 5,589,561 | 12/1996 | Barry et al. ........................... 526/348.1 |

FOREIGN PATENT DOCUMENTS

| | | |
|---|---|---|
| 0052557 | 5/1982 | European Pat. Off. . |
| 0144999 | 6/1985 | European Pat. Off. . |
| 51-98575 | 8/1976 | Japan . |
| 53-8272 | 1/1978 | Japan . |
| 53-66984 | 6/1978 | Japan . |
| 58-157839 | 9/1983 | Japan . |
| 58-220738 | 12/1983 | Japan . |
| 0144642 | 6/1985 | Japan . |
| 13464234 | 2/1974 | United Kingdom . |
| 2029762 | 3/1980 | United Kingdom . |

OTHER PUBLICATIONS

"Ethylene Polymers", Encyclopedia of Polymer Science and Engineering, vol 6, pp. 430–443, 1985.
Derwent Index Abstract —"Ethylene Propylene Copolymer Composition" (1984).
Derwent Index Abstract —"Transparent, High Impact Strength, Resin Composition For Blow Moulding" (1978).
Derwent Index Abstract —"Polypropylene Compositons" (1981).
"Flexible Packaging Seminar Looks At Current Trends," *Australian Packaging* (Sep. 1982).
"UC Researchers Smash 0.915 PE Density Mark," "Ultralow Density PEs Are Tough, Flexible Versatile," *Plastics Newsfront* (Oct. 1984).
Gafeski, et al., "Sperulite Nucleation In Polypropylene Blends With Low Density Polyethylene," *Polymer* (Sep. 1984).
Plochocki, "Polyolefin Blends: Rheology, Melt Mixing, and Applications," *Polymer Blends* vol. 2 (1978); "Engineering Rheology in the Design and Fabrication of Industrial Polyblends," *Advances In Polymer Blends And Alloys Technology* vol. 2 (Jul. 1989).
"Polyethylene," *Resins And Compounds, Modern Plastics Mid–October Encyclopedia Issue*.
Socller, "A Sure Bright Spot In '83: Sheet and Film Barrier Coextrusions," *Modern Plastics International* (Dec. 1982).
"Packaging," *Modern Plastics International* (Aug. 1982).
"Rigid Plastics Are Getting A Foot In The Kitchen Door," *Chemical Week* (Oct. 12, 1983).
Sacharow, "Barrier Plastics," *Australian Packaging* (Jun. 1984).
Smoluk, "A Big New Bottle–Blow Market: Multi–Layer Containers," *Modern Plastics International* (Dec. 1983).
"Technical Report: Armaseal L81," *Australian Packaging* (Aug. 1982).
"Containers," *Encyclopedia Of Polymer Science And Technology*, vol. 4 (1966).

*Primary Examiner*—Paul J. Thibodeau

[57] ABSTRACT

A multilayer high gas barrier plastic article wherein the article comprises a laminate including at least one layer of a high gas barrier polymer and at least one layer composed of an intimate blend of a propylene based polymer and an amount of linear low density polyethylene wherein said linear low density polyethylene is up to thirty weight percent or less of the blend. The multilayer high gas barrier article incorporating the intimate blend in conjunction with a high gas barrier polymer layer has good gas barrier characteristics, good mechanical properties and excellent low temperature drop impact characteristics, particularly when fabricated into free-standing bottles.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–24 is confirmed.

Claims 25–30 are cancelled.

\* \* \* \* \*